Aug. 7, 1928.
B. R. MOORE
1,680,165
CAR LOADING
Filed Sept. 24, 1927   3 Sheets-Sheet 1
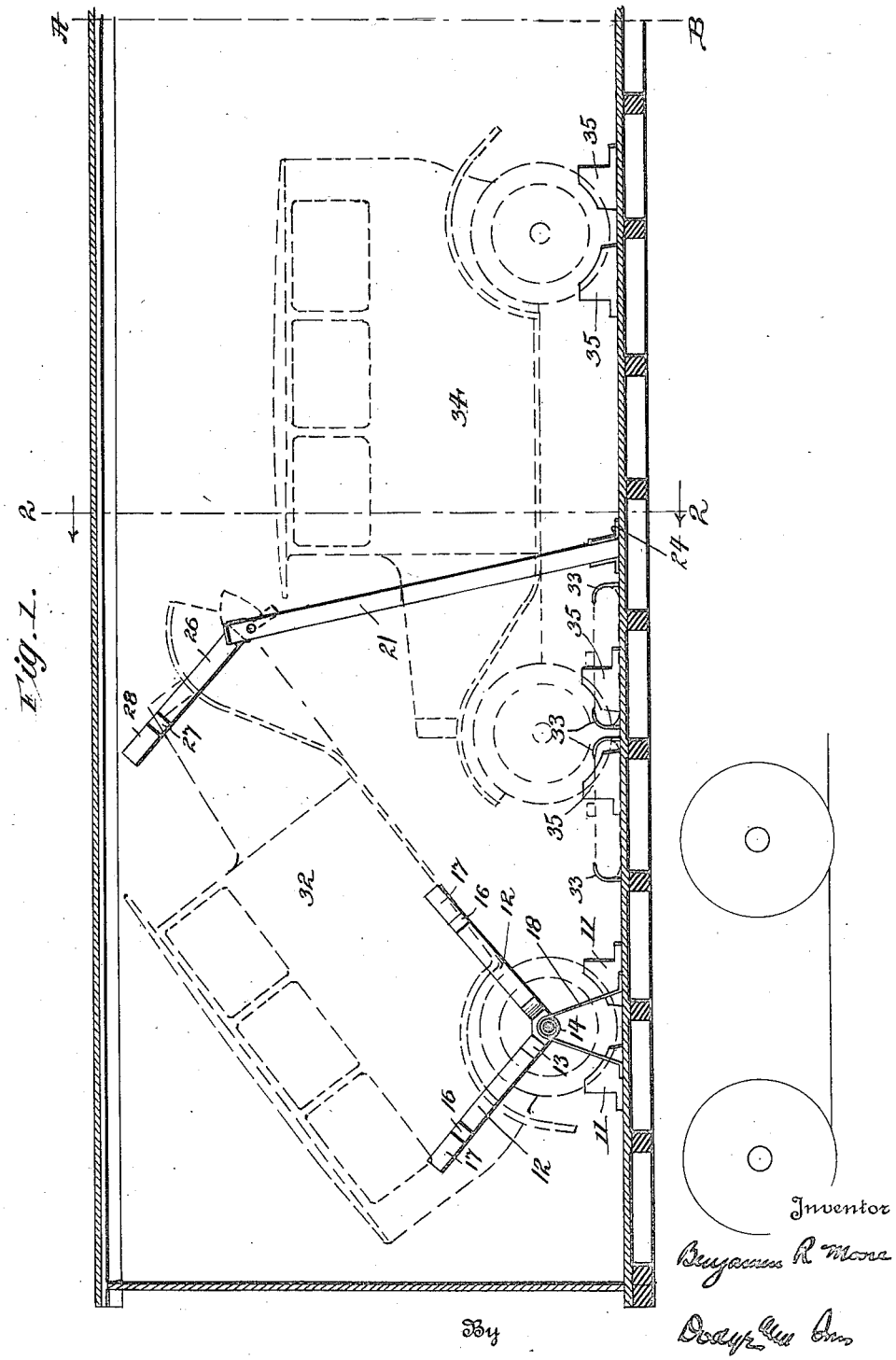

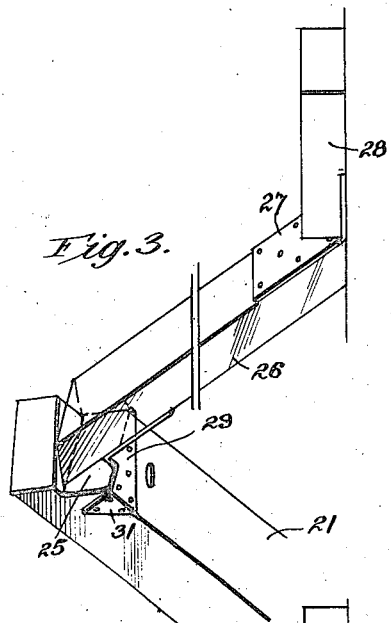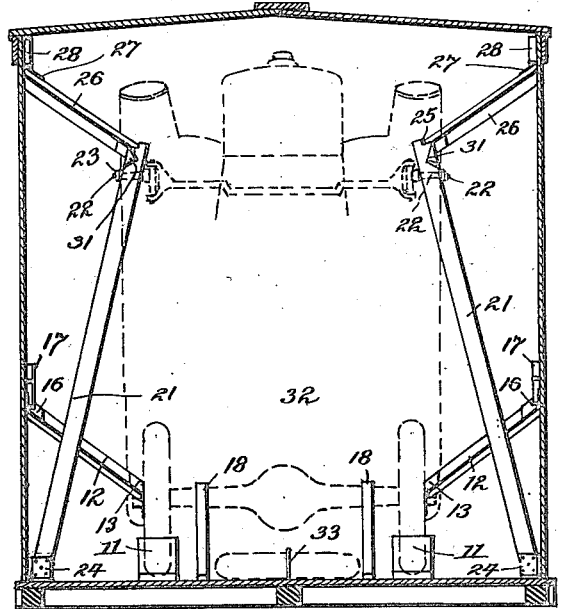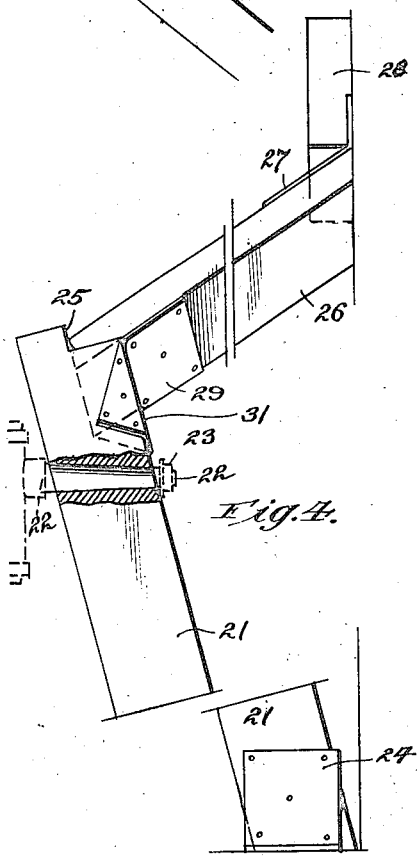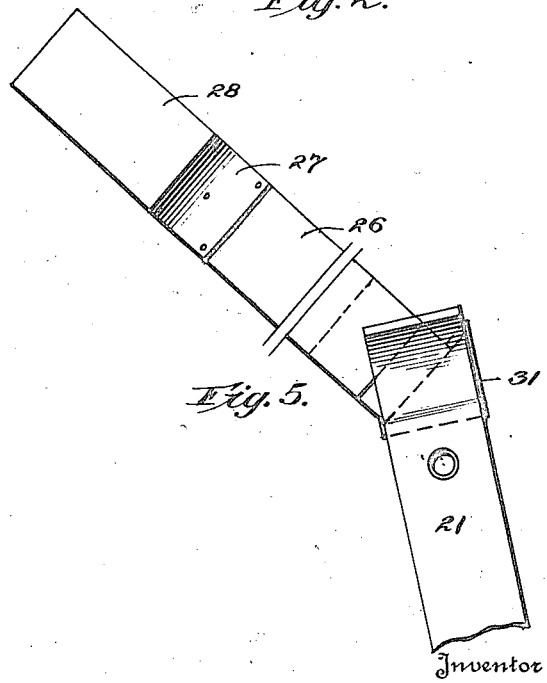

Aug. 7, 1928.
B. R. MOORE
CAR LOADING
Filed Sept. 24, 1927  3 Sheets-Sheet 3
1,680,165
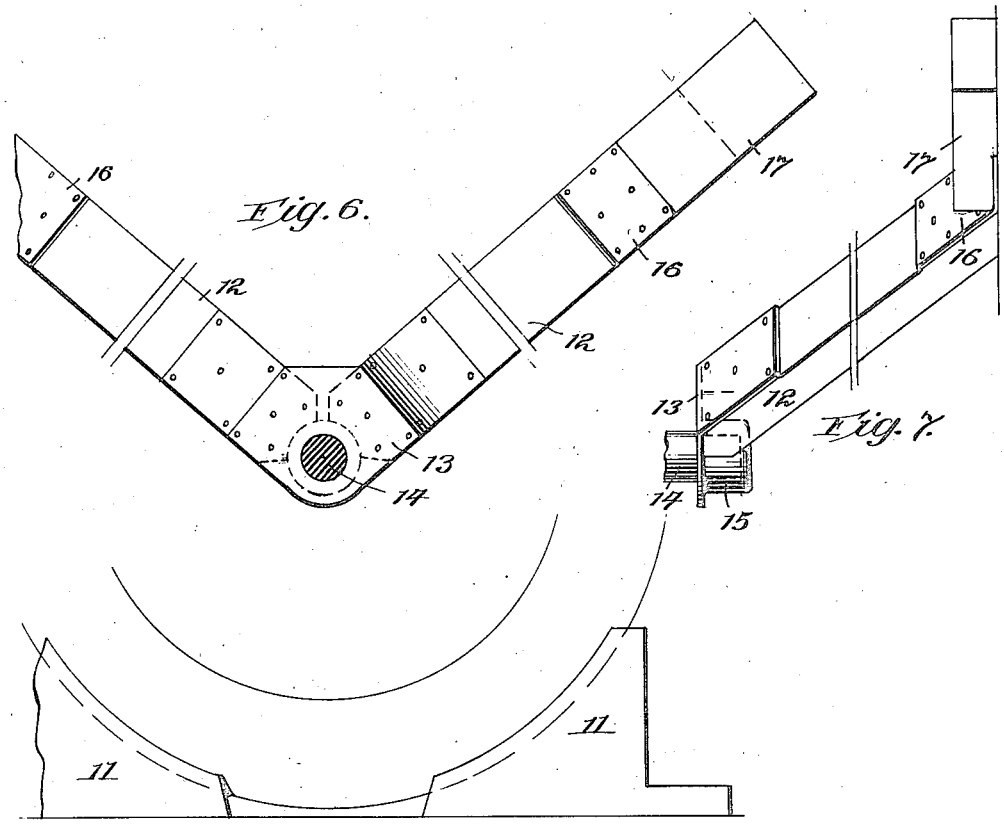
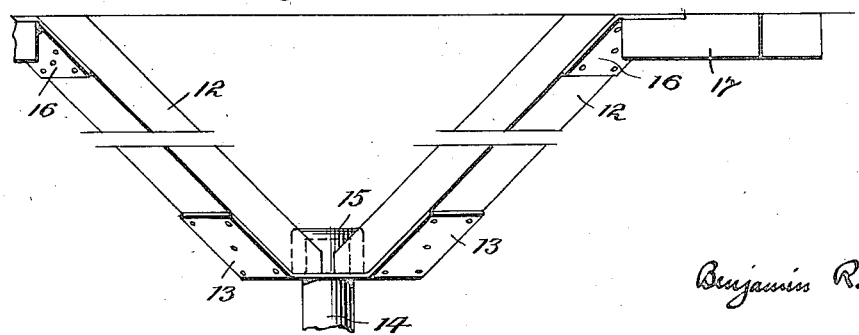
Inventor
Benjamin R. Moore
By
Attorney Patented Aug. 7, 1928.

1,680,165

UNITED STATES PATENT OFFICE.

BENJAMIN R. MOORE, OF DETROIT, MICHIGAN, ASSIGNOR TO DODGE BROTHERS, INC., OF HAMTRAMCK, DETROIT, MICHIGAN, A CORPORATION OF MARYLAND.

CAR LOADING.

Application filed September 24, 1927. Serial No. 221,750.

This invention relates to railway rolling stock and particularly to freight cars for automobiles. The object of the invention is to provide a simple and satisfactory system of loading to be used in what is known as "half decking". In "half decking" the automobiles are arranged in a longitudinally inclined position, with one pair of wheels (usually the rear) resting on the car floor and the other pair elevated.

The invention provides an inexpensive and secure bracing structure, which is readily applied and which is adapted to freight cars of somewhat different dimensions. Generally stated, the rear wheels are confined by chocks in which they are retained by hold-down devices, which serve as diagonal braces to the side wall of the car. The front wheels are removed and to the axle spindles are applied struts. Each such strut extends to the floor in a plane approximately tangent at its middle to an imaginary cylinder having the rear axle as its axis. The struts are splayed outward and each strut has a diagonal brace which extends from the strut upward to the car eaves, and obliquely so as to resist motion of the front axle in directions both longitudinal and transverse relatively to the car.

It results that the automobile axles are locked in fixed positions very simply and inexpensively, and the automobile springs are effective to cushion shocks in a material degree.

Automobiles so supported may be arranged relatively to each other in various ways, and the selection depends somewhat on the size and type of the automobile. Particular advantage is secured with sedans by the arrangement shown, in which two automobiles are mounted in inclined or "half decked" positions with their rear ends at opposite ends of the car, and two other automobiles are placed rear to rear on their wheels, between, and with their hoods extending under the half decked automobiles.

The preferred embodiment of the invention is illustrated in the accompanying drawing, in which,—

Fig. 1 is a longitudinal section through one half of a box car, illustrating the supporting means for one of the end automobiles. The positions assumed by two automobiles are shown in dotted lines. The lading of the other end of the car would be symmetrical with reference to the line A—B.

Fig. 2 is a transverse section on the line 2—2 of Fig. 1.

Fig. 3 is a fragmentary view showing the upper end of the strut for the right axle spindle, looking to the right relatively to Fig. 1.

Fig. 4 is a view, partly broken away, showing the strut for the left axle spindle together with its brace, looking to the left relatively to Fig. 1.

Fig. 5 is a fragmentary elevation showing a portion of the structure illustrated in Fig. 4, looking to the right relatively to Fig. 4.

Fig. 6 is an elevation showing chocks and diagonal braces for the left rear wheel.

Fig. 7 is an elevation of the braces shown in Fig. 6, looking to the left relatively to Fig. 6.

Fig. 8 is a plan view of the braces shown in Fig. 6.

In loading the car two automobiles are placed one in each end of the car with the rear of the automobile adjacent the end of the car and with the center line of the automobile alined with the longitudinal center line of the car. Each rear wheel is then confined securely by a pair of chocks 11 which are nailed to the floor.

The rear hub caps are removed and a bracing structure is applied at each side of each car (see particularly Figs. 6, 7 and 8), which includes two strut members 12 connected by a V-shaped plate 13. The plate 13 is formed with an opening which receives the projecting end 14 of the hub and the plate 13 is retained on the hub by a false cap 15 screwed in place in lieu of the regular hub cap. The V-shaped plate 13 is bent sharply adjacent the end of each strut member 12 so that one of these strut members extends diagonally upward and forward from the hub into contact with the side wall of the car, while the other one extends upward and rearward of the hub also into contact with the side wall of the car. Connection with the side wall of a car is effected by angle plates 16 attached to each strut member 12 and attached to the side wall of the car by means of blocks 17 which overlie them. The blocks 17 serve as thrust members for the strut members 12.

In case of moderate variations in the dimensions of the car the bends in the V-shaped plate 13 and the angle plate 16 may be modified to suit. The chocks and braces coact to prevent motion of the rear axle in any direction. If desired, hold-down straps 18 (see Figs. 1 and 2) may be added. These are attached at their ends to the floor of the car and are looped over the top of the rear axle.

The front wheels are then removed and the front ends of the automobiles are elevated to a height dependent on the vertical dimensions of the car.

In this position the automobiles are sustained primarily by struts 21, one applied to each front wheel spindle 22 and retained thereon by a nut 23. The struts 21 are approximately tangent at their mid-lengths to the periphery of an imaginary cylinder whose axis is the rear axle of the automobile. Furthermore the struts 21 are splayed outward so that their lower ends are adjacent the side walls of the car. They are connected to the floor by means of angle plates 24. At their upper ends the struts are angularly notched, as indicated at 25, each to receive the end of a corresponding brace 26 which extends from the upper end of the strut 21, above the spindle 22, upward and outward to the side wall of the car to which each brace is connected by an angle plate 27. These angle plates are further retained, and a thrust resistance is offered to the braces, by blocks 28 which overlie them and which are nailed to the side wall of the car.

The connection between the braces 26 and the strut 21 is reinforced by an angle plate 29 which has a portion 31 bent over the edge of the strut 21 so that the plate 29 engages the strut 21 on two sides.

Not only do the braces 26 extend upward and outward, but they are also inclined toward the rear of the automobile at such an angle that they also are approximately tangent at their mid-length to an imaginary cylinder inscribed on the rear axle of the automobile as an axis. Thus the strut 21 and the brace 26 are favorably situated not only to resist lateral motion of the automobile relatively to the car, but also to resist rotation of the automobile as a whole about its rear axle as an axis.

The general positions assumed by the half decked automobiles are indicated in dotted lines at 32. The front wheels of such cars are lashed to the floor, as indicated at 33, but may be otherwise arranged in any preferred manner. One of the two intervening cars is indicated in dotted lines at 34. It is retained by chocks 35.

The particular arrangement adopted is peculiarly desirable, because it permits a maximum lading of the car, and half the cars are supported on their wheels.

What is claimed is,—

1. The combination with a railway box car, of means for sustaining a wheeled vehicle therein, comprising: means for supporting one axle of the vehicle so that the vehicle may swing in a vertical plane about the same; a pair of struts and a pair of braces associated therewith, connected in supporting relation with the other axle of said vehicle, said struts being splayed outward and connected with the car body adjacent the junction of floor and sides, and said braces being splayed outward and connected with the car body adjacent the eaves.

2. The combination with a railway box car, of means for sustaining a wheeled vehicle therein, comprising: means for supporting one axle of the vehicle so that the vehicle may swing in a vertical plane about the same; a pair of struts and a pair of braces associated therewith, connected in supporting relation with the other axle of said vehicle, said struts being splayed outward and connected with the car body adjacent the junction of floor and sides, and said braces being splayed outward and connected with the car body adjacent the eaves, said struts and braces being respectively substantially tangent at their middles to imaginary cylinders having the first named axle as their axis.

3. The combination with a railway box car, of means for sustaining a wheeled vehicle therein, comprising: chocks in which one pair of wheels of the vehicle are confined so that the vehicle may swing in a vertical plane about one axle; metal connectors one locked on the hub of each such wheel; thrust members connected in pairs with said connectors and extending therefrom divergently upward to the side wall of the car; a pair of struts and a pair of braces associated therewith, connected in supporting relation with the other axle of said vehicle, said struts being splayed outward and connected with the car body adjacent the junction of the floor and side walls, and said braces being splayed outward and connected with the car body adjacent the eaves.

4. The combination with a railway box car, of means for sustaining a wheeled vehicle therein, comprising: chocks in which one pair of wheels of the vehicle are confined so that the vehicle may swing in a vertical plane about one axle; metal connectors one locked on the hub of each such wheel; thrust members connected in pairs with said connectors and extending therefrom divergently upward to the side wall of the car; thrust blocks fixed on the side wall of the car in position to resist thrust by said members; angle plates reinforcing the ends of said members; a pair of struts and a pair of braces associated therewith, connected in supporting relation with the other axle of said vehicle, said struts being splayed outward and connected with the car body adjacent the junction of the floor and side walls, and said braces being splayed outward and connected with the car body adjacent the eaves; and angle braces between said struts and braces and between the same and the car body.

5. The combination with a railway box car, of means for sustaining a wheeled vehicle therein, comprising: chocks in which one pair of wheels of the vehicle are confined so that the vehicle may swing in a vertical plane about one axle; metal connectors one locked on the hub of each such wheel; thrust members connected in pairs with said connectors and extending therefrom divergently upward to the side wall of the car; a pair of struts and a pair of braces associated therewith, connected in supporting relation with the other axle of said vehicle, said struts being splayed outward and connected with the car body adjacent the junction of the floor and side walls, and said braces being splayed outward and connected with the car body adjacent the eaves, said struts and braces being respectively substantially tangent at their middles to imaginary cylinders having the first named axle as their axis.

6. The combination with a railway box car, of means for sustaining a wheeled vehicle therein, comprising: chocks in which one pair of wheels of the vehicle are confined; a pair of struts extending upward to the car wall from each such wheel, one strut of each pair being inclined obliquely forward and the other obliquely rearward; and pairs of braces one pair fixed to each axle spindle of the other pair of wheels, and each pair including a member which extends from said spindle to the floor of the car adjacent the side wall, and a member which extends from the last named member obliquely to a point adjacent the car eaves.

7. The method of loading motor vehicles in freight cars which consists in supporting two automobiles in inclined positions in the opposite ends of the car, each automobile resting on its rear wheels, with its rear end adjacent the end of the car and its forward end elevated to a position adjacent the roof of the car, and then interposing between said two automobiles, two other automobiles resting on their wheels with their rear ends adjacent each other and their forward ends extending beneath the forward portions of said inclined automobiles.

In testimony whereof I have signed my name to this specification.

BENJAMIN R. MOORE.